May 30, 1961 R. A. WILLYARD 2,986,062
WEIGHING SCALE
Filed Sept. 25, 1956 2 Sheets-Sheet 1
Fig. I
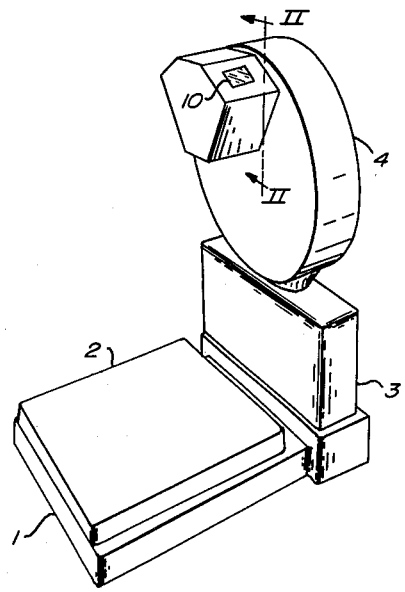
Fig. III
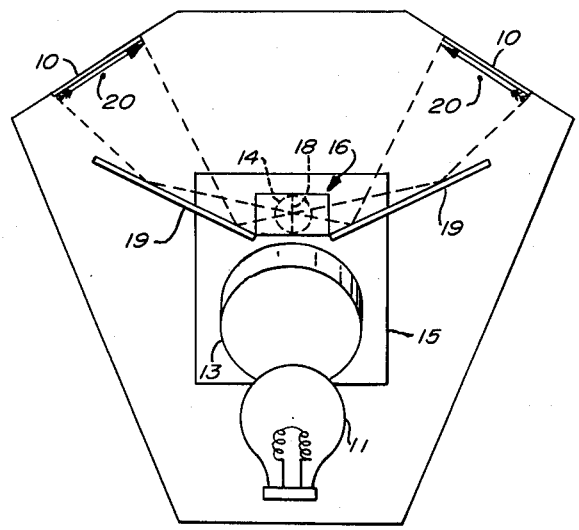
INVENTOR.
ROGER A. WILLYARD
BY
Marshall, Marshall & Yeasting
ATTORNEYS May 30, 1961   R. A. WILLYARD   2,986,062
WEIGHING SCALE
Filed Sept. 25, 1956   2 Sheets-Sheet 2
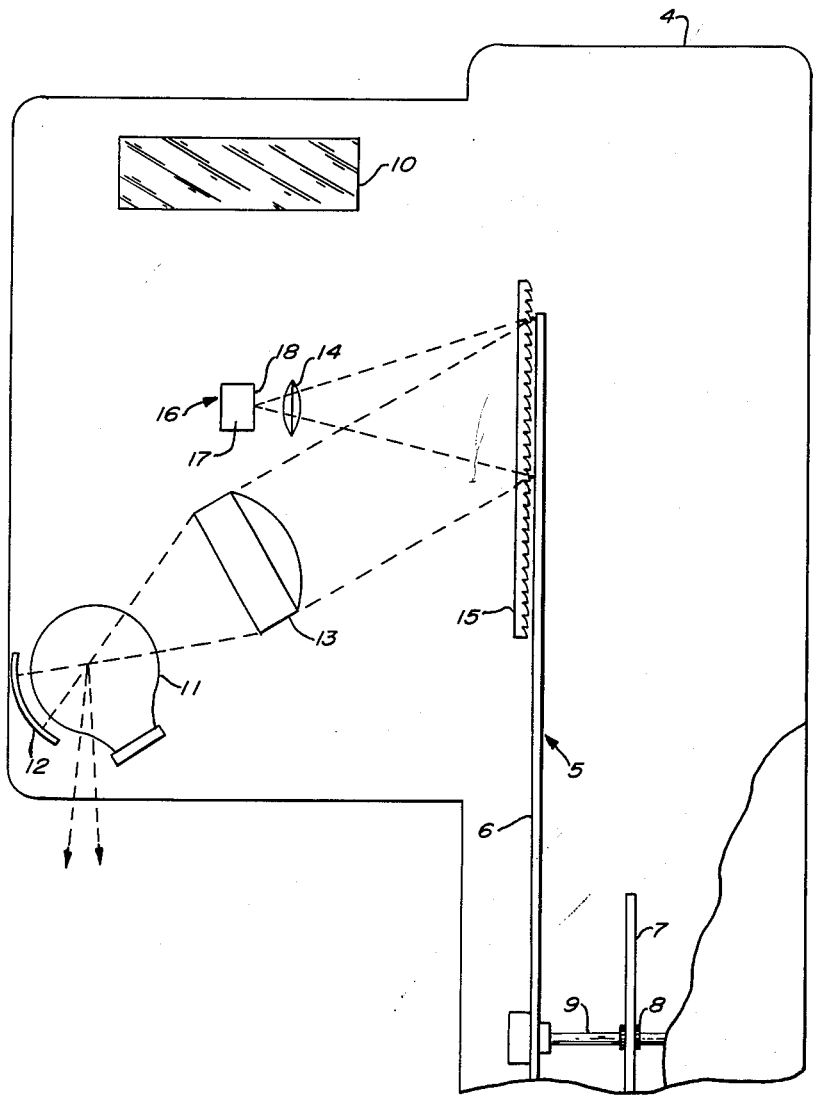
Fig. II
INVENTOR.
ROGER A. WILLYARD
BY
Marshall, Marshall & Yeasting
ATTORNEYS

United States Patent Office 2,986,062
Patented May 30, 1961

2,986,062
WEIGHING SCALE

Roger A. Willyard, Toledo, Ohio, assignor, by mesne assignments, to Toledo Scale Corporation, Toledo, Ohio, a corporation of Ohio Filed Sept. 25, 1956, Ser. No. 611,832

2 Claims. (Cl. 88—1)

This invention relates to weighing scales and in particular to projected indication weighing scales.

Weighing scales embodying the invention are well suited for use as airline baggage scales, since they may be placed sideways in existing baggage openings in the counters of transportation offices while providing visible indications of weight to both a passenger on one side of the counter and to an attendant on the other side of the counter from wide angle positions.

In transportation offices, such as airline offices, passengers carry in their baggage and either hand it to an attendant to be weighed behind a counter or place it on the load receiving platform of a weighing scale located in a baggage opening in the counter. In either case, the passengers cannot easily check the weight which the attendant records. The baggage scales presently in use, when placed sideways in an opening in a counter so that a passenger can place baggage on the weighing platform from one side of the counter and so that an attendant can remove the baggage from the other side of the counter, present visible indication of weight viewable along a line of sight extending transverse to the normal line of sight of both the passenger and the attendant who stand facing each other across the counter. To see the indication of weight, the passenger and the attendant must lean over the baggage opening in the counter and crane their necks—a clumsy maneuver at this important point of customer contact.

The baggage scales presently in use, furthermore, have an even more marked disadvantage. Such scales are provided with magnifying lenses to provide enlarged virtual images of weight indicia on indicia bearing charts which are mounted to rotate according to the loads upon the scales. The enlarged virtual images of the areas displayed are seen by observers as though at the end of tunnels which makes impossible wide angle viewing and creates errors due to parallax.

The principal object of this invention is to provide a weighing scale in which brilliant images of indicia on a chart are projected onto a pair of display screens to permit the images to be seen from wide angle positions.

Another object of the invention is to provide, in a weighing scale having an indicia bearing chart, an optical projection system which conserves and concentrates light to obtain particularly brilliant projected images of the indicia on the chart.

A further object is to provide a weighing scale in which images of indicia on a chart are projected onto a pair of display screens which are directed upwardly and forwardly and upwardly and rearwardly respectively at angles to facilitate observation of images of indicia borne by the chart by persons standing before and behind the platform.

Still another object is to provide, in a weighing scale having a load receiving platform and an indicia bearing chart, an optical projection system having a light source which functions both to illuminate the platform and to illuminate the chart.

More specific objects and advantages are apparent from the following description of a preferred embodiment of the invention.

A weighing scale embodying the invention includes a load receiving platform, a chart housing extending upwardly at one side of the platform, an indicia bearing chart mounted in the housing and operatively connected to the platform, and an improved optical projection system for displaying projected indications of load upon the platform. The optical projection system includes a pair of display screens which preferably are directed upwardly and forwardly and upwardly and rearwardly respectively at angles to facilitate observation of images of indicia borne by the chart by persons standing before and behind the platform. Such an arrangement is particularly well suited for an airline baggage scale to provide an easily viewable indication of weight to both a passenger in front of the scale and to an attendant in back of the scale. The optical projection system is especially designed to conserve and concentrate light to obtain particularly brilliant images for wide angle viewing and obviates errors due to parallax; it comprises, in addition to the pair of display screens, a light source located to throw light obliquely onto the area of the indicia bearing chart to be displayed, a projection lens for projecting images of indicia within its field of view, a lens segment located between the area to be displayed and the projection lens to concentrate and change the direction of light reflected from said area so that it is directed to the projection lens, and reflecting surfaces for directing onto the screen images of indicia projected by the projection lens.

A preferred embodiment of the invention is illustrated in the accompanying drawings:

In the drawings:

Figure I is a perspective view of a portable weighing scale having optical projection viewing means according to the invention.

Figure II is an enlarged schematic view of the optical projection viewing means as seen from the line II—II of Figure I.

Figure III is a schematic view of the optical projection viewing means as seen from a position to the left of Figure II looking toward the weighing scale.

These specific figures and the accompanying description are intended merely to illustrate the invention but not to impose limitations on the claims.

Referring to Figure I, the portable weighing scale includes a base 1, a load receiving platform 2 supported above the base by means of a conventional lever system contained within the base, but not shown in the drawings, and a column 3 extending upwardly at one side of the platform. The column 3 is surmounted by a generally watchcase-shaped chart housing 4 that houses a flat, annular indicia bearing chart 5 (Fig. II) which is mounted to rotate in the housing in a generally vertical plane. The indicia bearing surface 6 of the chart 5 is a reflecting surface, being made, for example, of etched, buffed aluminum or chromium. A chromium faced dial provides a specular indicia bearing surface for high reflectivity in the optical projection system hereinafter described.

When loads applied to the load receiving platform 2 are counterbalanced by a counterbalancing mechanism, e.g., a conventional pendulum mechanism, contained within the chart housing 4, but not shown in the drawings, the weighing movement of the mechanism moves a rack 7 through a distance that is proportional to the load. The rack 7 cooperates with a pinion 8 on a chart shaft 9 fixedly attached to the chart 5 to rotate the chart through angles that are proportional to the loads.

In order that persons standing before and behind the platform 2 may see weight indications of loads upon the platform from wide angle positions, the weighing scale is provided with an improved optical projection system having a pair of display screens 10 which are directed upwardly and forwardly and upwardly and rearwardly respectively at angles to facilitate observation of images of indicia borne by the chart 5 by persons standing before and behind the platform. The weighing scale is designed to fit sideways in existing baggage openings in the counters of transportation offices. By "sideways" is meant the position of the weighing scale as viewed in Figure I. Hence, it is not necessary for a passenger and an attendant to lean over the baggage opening in the counter and crane their necks to view the indication of the weight of baggage placed upon the load receiving platform by the passenger standing before the counter and subsequently removed by the attendant standing behind the counter.

The optical projection system also includes a suitable light source 11, backed up by a reflector 12, and a condensing lens 13 for obliquely illuminating the area of the chart 5 to be displayed. As indicated in Figure II, the light source 11 is so located that it functions additionally to illuminate the platform 2. The light source 11 may be a conventional dual filament bulb or an ordinary bulb with a single filament in two sections, e.g., a single filament long enough to serve as two sections producing two light sources, the bulb being properly indexed, for example by means of an ordinary bayonet joint, to correctly orient the filaments or the sections.

In order to concentrate or focus and change the direction of the light reflected from the area of the chart 5 to be displayed to conserve light so that very brilliant images of the indicia in such area are projected by a projection lens 14, a lens segment 15, which may be of the Fresnel type, is located between the area on the chart to be displayed and the projection lens. Because the light source 11 throws light obliquely onto the area of the chart to be displayed, if it were not for the lens segment 15 much of the light from the chart would be reflected toward the top of the housing 4 where it would be lost. The lens segment 15 allows employment of the highly directional reflection characteristics of a specular dial to full advantage. As a result, nearly all of the light cast on the dial face is redirected into the projection lens 14 as in the case of projection involving transparencies, and the high losses associated with diffusing surfaces are obviated.

The lens segment 15 directs the light reflected from the chart 5 to the projection lens 14 which is located adjacent an ordinary beam dividing, reflecting prism 16. An example of such a prism is shown in U.S. Patent No. 2,457,170, issued on Dec. 28, 1948, to K. Mitchell. The prism 16 has a pair of externally reflecting surfaces 17, one of which is shown in Figure II, which intersect along an edge 18 and that are perpendicular to each other and which function to divide the beam of light from the projection lens 14 and to direct onto mirrors 19 images of indicia projected by the projection lens, the mirrors 19 functioning in turn to direct such images in suitable orientation for viewing, as indicated by the arrows in Figure III, onto the display screens 10. The beam dividing prism 16 is a low cost device for obtaining two sets of identical images and allows high efficiency and symmetry of design, however, a partially transparent mirror combined with a full reflecting mirror also could be used.

In general, a Fresnel lens causes rays of light to converge and it may emit a parallel beam or a convergent beam depending upon the angle of travel of the light rays from a source to the lens. Fresnel lenses are used commonly to change divergent rays of light into parallel rays as for example in lighthouses where light from lamps is sent out in parallel beams to be seen from great distances. As indicated in Figure II, however, the rays of light reflected from the chart 5 onto the lens segment 15, of the Fresnel type, are for all practical purposes parallel, the chart being very close to the lens, so that the lens segment 15 functions to cause such parallel rays to converge.

Light rays from one of the filaments or of the filament sections of the light source 11 are directed to one of the reflecting surfaces 17 of the prism 16 and light rays from the other of the filaments or filament sections are directed to the other of the reflecting surfaces 17. Such rays are centered by moving the lens segment 15 up or down and are initially concentrated on the prism 16 by moving the condensing lens 13 toward or away from the light source 11. Images of the indicia borne by the chart 5 are focused on the screens 10 by moving the objective lens 14 or the chart 5. When the reflecting prism 16 is located to symmetrically divide the dual (filaments or sections) source image, excellent final images are obtained on the screens 10 with commercial grade condenser optics.

When observers see the images of the indicia on the display screens 10, they also see shadows of reading lines 20 which may be stretched cords, threads or fine stretched wires (Figure III). The reading lines 20 appear to the observers to be directly on the display screens 10. Since the images of the indicia also are displayed on the screens, wide angle viewing of weight indications is possible without creating errors due to parallax. The reading lines also may be printed directly on the screens 10.

The weighing scale is well suited for use as an airline baggage scale because indications of weight are provided for both a passenger in front of the scale and an attendant in back of the scale and because such indications are projected indications of great brilliancy, due to the light conserving design of the optical system, for wide angle and non-parallax viewing.

Various modifications may be made in specific details of construction without departing from the spirit and scope of the invention.

Having thus described the invention, I claim:

1. A weighing scale comprising, in combination, a load receiving platform, a chart housing extending upwardly at one side of the platform, a specular surfaced chart mounted in the housing and operatively connected to the platform, the chart having a set of load indicating indicia on its specular surface, and an optical projection system for displaying duplicate images of said set of indicia, the optical projection system including a pair of display screens for observation of images of indicia borne by the chart by persons standing before and behind the platform, two light sources located to throw light obliquely onto the area of the chart to be displayed, a projection lens for projecting images of indicia within its field of view, a lens segment located between the area to be displayed and the projection lens to direct light reflected from said area into the projection lens, and reflecting surfaces angularly disposed with respect to one another and oriented such that one of said surfaces directs light specularly reflected from said chart originating from one of said two light sources to one of said pair of display screens and the other of said surfaces directs light specularly reflected from said chart originating from the other of said two light sources to the other of said pair of display screens for directing onto the screens said duplicate images of indicia projected by the projection lens.

2. A weighting scale according to claim 1 wherein the display screens are directed upwardly and forwardly and upwardly and rearwardly respectively at angles to facilitate observation of images of indicia borne by the chart by persons standing before and behind the platform.

References Cited in the file of this patent

UNITED STATES PATENTS

| | | |
|---|---|---|
| 1,792,046 | Skaupy | Feb. 10, 1931 |
| 1,880,415 | Carroll | Oct. 4, 1932 |

(Other references on following page)

UNITED STATES PATENTS

| | | | |
|---|---|---|---|
| 1,942,508 | Clark | Jan. 9, | 1934 |
| 1,947,155 | Fuller | Feb. 13, | 1934 |
| 2,420,976 | Potter | May 20, | 1947 |
| 2,445,929 | Sturgess | July 27, | 1948 |
| 2,457,170 | Mitchell | Dec. 28, | 1948 |
| 2,564,501 | Pruitt | Aug. 14, | 1951 |
| 2,818,769 | Williams | Jan. 7, | 1958 |

FOREIGN PATENTS

| 159,668 | Austria | Oct. 25, 1940 |
|---|---|---|